United States Patent
Abe et al.

(10) Patent No.: US 11,169,397 B2
(45) Date of Patent: Nov. 9, 2021

(54) MANUFACTURING METHOD OF SPECTACLE LENS, SPECTACLE LENS MANUFACTURING SYSTEM, AND SPECTACLE LENS

(71) Applicant: NIKON-ESSILOR CO., LTD., Tokyo (JP)

(72) Inventors: Osamu Abe, Yokohama (JP); Mitsuo Obata, Abiko (JP)

(73) Assignee: NIKON-ESSILOR CO., LTD., Tokyo (JP)

( * ) Notice: Subject to any disclaimer, the term of this patent is extended or adjusted under 35 U.S.C. 154(b) by 297 days.

(21) Appl. No.: 16/283,356

(22) Filed: Feb. 22, 2019

(65) Prior Publication Data

US 2019/0187487 A1    Jun. 20, 2019

Related U.S. Application Data

(63) Continuation of application No. PCT/IB2017/055153, filed on Aug. 28, 2017.

(30) Foreign Application Priority Data

Aug. 22, 2016 (JP) .............................. JP2016-161609

(51) Int. Cl.
*G02C 7/02* (2006.01)
*G02C 13/00* (2006.01)
(Continued)

(52) U.S. Cl.
CPC .......... *G02C 7/021* (2013.01); *B24B 13/0055* (2013.01); *G02C 7/00* (2013.01);
(Continued)

(58) Field of Classification Search
CPC .......... B24B 13/0055; B29D 11/00028; B29D 11/00009; B29D 11/00317; G02C 7/021;
(Continued)

(56) References Cited

U.S. PATENT DOCUMENTS

2005/0073650 A1    4/2005   Ito

FOREIGN PATENT DOCUMENTS

| EP | 1 515 179 A1 | 9/2004 |
|----|--------------|--------|
| JP | 11-216650    | 8/1999 |

(Continued)

OTHER PUBLICATIONS

International Search Report dated Dec. 12, 2017 in corresponding International Patent Application No. PCT/IB2017/055153 (3 pages).

(Continued)

*Primary Examiner* — Tuyen Tra

(57) ABSTRACT

A manufacturing method of a spectacle lens provided with hidden markings includes: setting forming positions of the hidden markings to certain positions; changing the forming positions of the hidden markings based on at least one parameter obtained from spectacle lens product-related information that indicates information about a spectacle lens product, spectacle frame-related information that indicates information about a spectacle frame, prescription-related information that indicates information about a prescription for a wearer, and fitting-related information that indicates information about fitting for the wearer; and forming the changed hidden markings.

14 Claims, 11 Drawing Sheets

(51) Int. Cl.
*G02C 7/00* (2006.01)
*G02C 7/06* (2006.01)
*B24B 13/005* (2006.01)

(52) U.S. Cl.
CPC ............... *G02C 7/06* (2013.01); *G02C 7/061* (2013.01); *G02C 13/00* (2013.01)

(58) Field of Classification Search
CPC . G02C 13/00; G02C 7/00; G02C 7/06; G02C 7/061
See application file for complete search history.

(56) References Cited

FOREIGN PATENT DOCUMENTS

| | | |
|---|---|---|
| JP | 2006-47782 A | 2/2006 |
| JP | 2006-53227 | 2/2006 |
| JP | 2007-41569 A | 2/2007 |

OTHER PUBLICATIONS

Written Opinion of the International Search Authority dated Feb. 26, 2019 in corresponding International Patent Application No. PCT/IB2017/055153 (7 pages).
Chinese Office Action dated May 26, 2020, in corresponding Chinese Patent Application No. 201780051317.X (15 pages).
Office Action dated Apr. 21, 2020 in Japanese Patent Application No. 2016-161609.
Chinese Office Action dated Sep. 16, 2020, in corresponding Chinese Patent Application No. 201780051317.X.
Chinese Office Action dated Jan. 13, 2020 in Chinese Patent Application No. 201780051317.
Extended European Search Report dated Apr. 1, 2020 in corresponding EP Patent Application 17843048.4 (8 pages).
Examiner's Report dated Apr. 2, 2020 in corresponding Canadian Patent Application No. 3,034,555 (5 pages).
Office Action, dated Jul. 9, 2021, in corresponding Canadian Patent Application No. 3,034,555 (4 pp.).
Office Action, dated Apr. 16, 2021, in corresponding Chinese Application No. 201780051317.X (24 pp.).
Canadian Office Action dated Nov. 12, 2020, in corresponding Canadian Patent Application No. 3,034,555.

ML(MLa, MLe, MLf) : LAYOUT MARKING
MH(MHh~MHk)   : HIDDEN MARKING
    MHh, MHi  : ALIGNMENT REFERENCE MARKING
MHP(MHj, MHk) : PRODUCT INFORMATION MARKING

MANUFACTURING METHOD OF SPECTACLE LENS, SPECTACLE LENS MANUFACTURING SYSTEM, AND SPECTACLE LENS

CROSS REFERENCE TO RELATED APPLICATIONS

This is a Continuation of PCT Application No. PCT/IB2017/055153, filed on Aug. 28, 2017, which claims convention priority to Japanese patent application No. 2016-161609, filed Aug. 22, 2016. The contents of the above-mentioned applications are incorporated herein by reference.

FIELD OF THE INVENTION

The present invention relates to a manufacturing method of a spectacle lens, a spectacle lens manufacturing system, and a spectacle lens.

BACKGROUND

Progressive-power lenses are required to add thereon information about alignment reference markings, an addition power or its abbreviation, a manufacturer's name or a supplier's trademark, or their abbreviations as a permanent display not easily effaced (JIS T 7315). On single-vision lenses and multifocal lenses, alignment reference markings likewise those of the progressive-power lenses and markings for quality assurance by manufactures and suppliers are added in some cases. Those markings are formed as hidden markings by directly being engraved on a spectacle lens or by transfer from a mother mold in forming a semi-finished lens, for example.

Patent Literature 1 proposes a technique in which it is preliminarily determined whether the positions of the hidden markings are arranged inside a spectacle frame, and some of the hidden markings are arranged at certain positions inside the spectacle frame based on the determination result.

CITATION LIST

Patent Literature

[Patent Literature 1] Japanese Unexamined Patent Application Publication No. 2006-47782

SUMMARY

A first aspect of the invention provides a manufacturing method of a spectacle lens provided with a hidden marking. The manufacturing method of a lens includes: setting a forming position of the hidden marking to a certain position; changing the forming position of the hidden marking based on at least one parameter obtained from spectacle lens product-related information that indicates information about a spectacle lens product, spectacle frame-related information that indicates information about a spectacle frame, prescription-related information that indicates information about a prescription for a wearer, and fitting-related information that indicates information about fitting for the wearer; and forming the changed hidden marking.

A second aspect of the invention provides a spectacle lens manufacturing system for manufacturing a spectacle lens provided with a hidden marking. The lens manufacturing system includes: a design device that is capable of setting for forming the hidden marking by setting a forming position of the hidden marking to a certain position, calculating at least one parameter obtained from spectacle lens product-related information that indicates information about a spectacle lens product, spectacle frame-related information that indicates information about a spectacle frame, prescription-related information that indicates information about a prescription for a wearer, and fitting-related information that indicates information about fitting for the wearer, and changing the forming position of the hidden marking based on the calculated parameter; and a hidden marking forming device that forms the hidden marking by the setting set by the design device.

A third aspect of the invention provides a spectacle lens that includes a plurality of hidden markings other than an alignment reference marking set to a certain position with reference to a prism reference point of the spectacle lens, and in which a parameter calculated from at least an interpupillary distance of a wearer and a spectacle frame center distance exceeds a certain value, and the respective hidden markings are rearranged around a spectacle frame center or a point near the spectacle frame center.

DETAILED DESCRIPTION OF EMBODIMENTS

Figure 1:
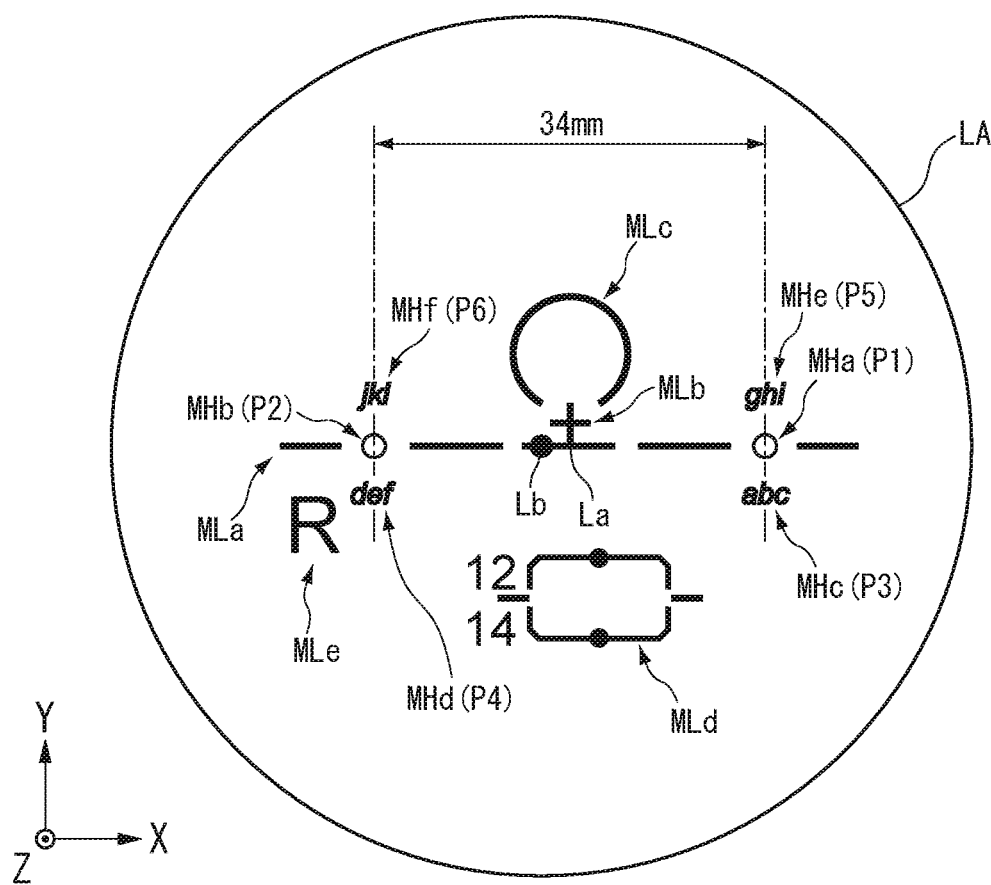
FIG. 1 is a diagram illustrating an example of a progressive-power lens.

The following describes an embodiment. In the following description, an XYZ orthogonal coordinate system, which is illustrated in FIG. 1, for example, is referred as appropriate. In the XYZ orthogonal coordinate system, an X direction and a Y direction are horizontal directions (lateral directions) while a Z direction is a vertical direction. For example, the X direction is the direction connecting roughly between nose and temple while the Y direction is the direction connecting roughly between forehead and chin. In each direction, the same side as the top of the arrow is called a positive side (e.g., the positive Z side) while the side opposite to the top of the arrow is called a negative side (e.g., the negative Z side) as appropriate. For example, in the vertical direction (Z direction), its upper side is the positive Z side while its lower side is the negative Z side. To explain the embodiment, the drawings schematically illustrate objects partially or wholly and include parts depicted by changing their scales such as partial enlargement or partial emphasis.

An example of the hidden markings, the alignment reference markings are composed of two markings that are equidistant from a perpendicular plane passing through a prism reference point of a spectacle lens and are apart from each other by 34 mm. As the hidden markings other than the alignment reference markings, markings are engraved that indicate information about a refractive index of a row material, information about a corridor length, information about a commercial product, and information about an inset amount besides information about an addition power and information about a manufacturer or a supplier. The hidden markings other than the alignment reference markings are typically engraved at positions near the two alignment reference markings on an upper or a lower side thereof. When an interpupillary distance (PD value) of a wearer is small and a small diameter frame is selected, the hidden markings including the alignment reference marking on a nose side are partially or wholly not inside the frame sometimes. In such a case, the hidden marking is formed in such a manner that a part of thereof is lost or the hidden marking is missing from the spectacle lens after edging processing. When the hidden marking that relates to the information about the manufacturer or the supplier and has a large design is engraved on an ear side, and the PD value of the wearer is large, the hidden marking relating to the information about the manufacturer or the supplier may be partially lost after the edging processing. The technique described in Patent Literature 1 solves a problem in that the hidden markings are not inside the spectacle frame and thus the hidden markings are missing. Slightly complicated calculation is, however, required to preliminarily determine whether the positions of the hidden markings are inside the spectacle frame. The hidden markings are originally and ideally arranged at an inner periphery of the spectacle frame with balance. Some of the hidden markings are, however, arranged near the center inside the spectacle frame in some cases. As described below, the inventors have gained insight that the hidden markings of the spectacle lens are arranged inside the spectacle frame with balance and possibility of the hidden markings being lost or missing can be markedly reduced.

First, markings of a spectacle lens are described. FIG. 1 is a diagram illustrating an example of a progressive-power lens. A progressive-power lens LA illustrated in FIG. 1 is a spectacle lens (circular lens) before the edging processing. The progressive-power lens LA is provided with a plurality of layout markings ML and a plurality of hidden markings MH, for example. In the following description, a surface on an eye side out of both surfaces of the lens is called an inner surface while a surface on an object side is called an outer surface as appropriate.

The layout markings ML, which are designed in accordance with a product of the spectacle lens, for example, are printed on a surface (typically, the outer surface) of the progressive-power lens LA after surface treatment. The layout markings ML disappear after the edging processing. The layout markings ML includes a horizontal reference line MLa, a distance eye point marking MLb, a distance dioptric power measuring position marking MLc, a near dioptric power measuring position marking MLd, and a left-right display marking MLe, for example. The horizontal reference line MLa and the distance eye point marking MLb serve as alignment reference when the spectacle lens is put into a spectacle frame. The distance dioptric power measuring position marking MLc is the position at which a distance dioptric power is measured by a lens meter or the like. The near dioptric power measuring position marking MLd is the position at which a near dioptric power (an add power) is measured by the lens meter or the like. The left-right display marking MLe indicates that the spectacle lens is used for either right eye or left eye. The layout markings ML are not limited to those described above. For example, the layout markings ML may not include some of the layout markings ML (MLa to MLe) or may include other markings.

The hidden markings MH are unique identification markings according to types of spectacle lenses, for example. The hidden markings MH are engraved at certain positions on the spectacle lens such that the hidden markings MH do not disappear after the spectacle lens is subjected to the edging processing, for example. The hidden markings MH are formed such that the hidden markings MH do not become hindrance (e.g., hindrance to eyesight) when a wearer wears the spectacle lenses. For example, the hidden markings MH are formed such that the hidden markings MH are hardly visually recognized with a level of the hidden markings MH being capable of being recognized when the spectacle lens is tilted such that light transmitted or reflected by the hidden markings MH can be seen. The hidden markings MH include at least one of an add power marking, a refractive index marking, a corridor length marking, a surface treatment marking, a manufacturer marking and an inset amount marking besides the alignment reference markings MHa and MHb.

The alignment reference markings MHa and MHb serve as alignment reference when the layout markings ML are printed or an alignment sheet is bonded after the spectacle lens is put into the frame. The alignment reference markings MHa and MHb are set at certain positions with reference to the prism reference point of the spectacle lens. The alignment reference markings MHa and MHb are composed of two markings that are equidistant from the perpendicular plane passing through the prism reference point La and apart from each other by 34 mm, for example. The alignment reference marking MHa is formed at a position (certain position) P1 apart from the prism reference point La by 17 mm in the right horizontal direction while the alignment reference marking MHb is formed at a position (certain position) P2 apart from the prism reference point La by 17 mm in the left horizontal direction. The prism reference point La is also called an optical center or a design center sometimes. The prism reference point La coincides with a geometric center Lb of the spectacle lens LA in some cases.

The alignment reference markings MHa and MHb are formed by transfer from a mother mold in forming a semi-finished lens, for example. The semi-finished lens is a lens only the outer surface of which is completed as an optical surface out of the outer surface and the inner surface thereof, for example. The semi-finished lens is manufactured as the spectacle lens by grinding and polishing the inner surface thereof. The alignment reference markings MHa and MHb are formed on the outer surface (the optical surface is almost established in forming) on which no grinding and polishing are performed of the semi-finished lens, for example.

The alignment reference markings MHa and MHb are formed in processing after forming the semi-finished lens sometimes. In such a case, the alignment reference markings MHa and MHb are typically engraved on the inner surface of an intermediate lens after polishing processing. The intermediate lens is the spectacle lens after polishing and grinding processing is performed on the semi-finished lens but surface treatment processing is not yet performed on the spectacle lens. The intermediate lens is processed in an elliptical shape or other shapes in a grinding process for the purpose of providing a thinner lens, for example, in some cases. The shape of the intermediate lens is not limited to a circular shape. The shape may be an elliptical shape or other shapes.

The following describes markings formed as the hidden markings MH other than the alignment reference markings MHa and MHb. Hidden markings MHc to MHf, which are the exemplary hidden markings other than the alignment reference markings MHa and MHb, are described below. The hidden markings MHc to MHf other than the alignment reference markings MHa and MHb are not limited to ones described below, and may include other markings.

The add power marking indicates information about an add power of the spectacle lens. The add power indicates a difference between a distance dioptric power and a near dioptric power. The refractive index marking indicates information about a refractive index of a row material of the spectacle lens. The corridor length marking indicates information about a corridor length of the progressive-power lens. The product marking indicates information about a product (e.g., information to identify a type or a name of the product). The product marking is the marking inherent to a progressive-power lens product, for example. Some of the product markings have display designs changed by surface treatment. The surface treatment marking indicates information about the surface treatment of the spectacle lens. The inset amount marking indicates information about a shift amount of the near dioptric power measuring position of the spectacle lens. The inset amount marking indicates the inset amount, which is the shift amount of the near dioptric power measuring position when the near dioptric power measuring position is shifted in the left or right direction. The manufacturer marking indicates information about a manufacturer or a supplier (glasses shop as a customer) of the spectacle lens. The manufacturer marking is a customer's brand name engraved in accordance with a request from the customer.

The hidden markings MHc to MHf other than the alignment reference markings MHa and MHb are formed at respective certain positions. The each of the hidden markings MHc to MHf is formed any one of a position P3 on the lower side of the alignment reference marking MHa on the nose side, a position P5 on the upper side of the alignment reference marking MHa on the nose side, a position P4 on the lower side of the alignment reference marking MHb on the ear side, and a position P6 on the upper side of the alignment reference marking MHb on the ear side. Two or more types of hidden markings MH are formed at the single position in some cases. Any of the hidden markings is omitted to be formed in some cases. The hidden markings MHc to MHf other than the alignment reference markings are typically engraved on the inner surface of the intermediate lens after the polishing processing. At least one of the hidden markings MHc to MHf other than the alignment reference markings may be engraved at a certain position on the outer surface. In the following description, the hidden markings MHc to MHf other than the alignment reference markings MHa and MHb are called product information markings MHP.

Figure 2:
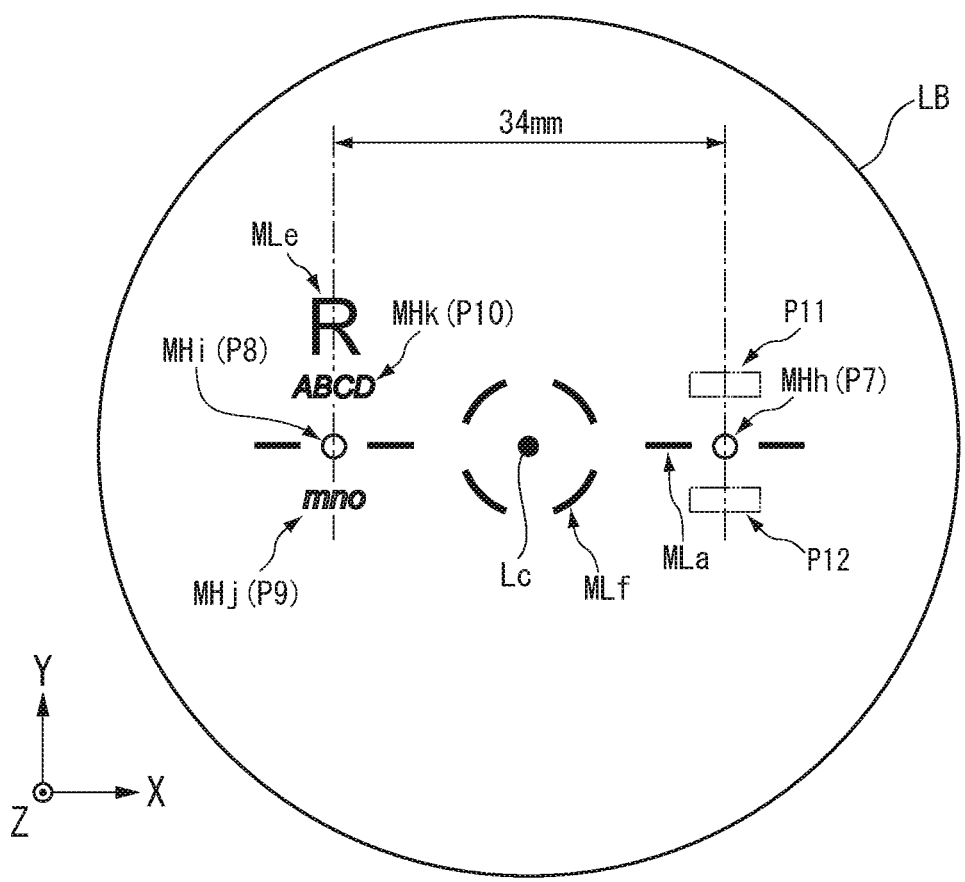
FIG. 2 is a diagram illustrating an example of a single-vision lens.

The following describes markings of a single-vision lens. FIG. 2 is a diagram illustrating an example of the single-vision lens. FIG. 2 illustrates a single-vision lens LB, which is a spectacle lens (circular lens) before the edging processing, as an example. The single-vision lens LB is provided with the multiple layout markings ML and the multiple hidden markings MH, for example.

The layout markings ML include the horizontal reference line MLa, the left-right display marking MLe, and a dioptric power measuring position marking MLf, for example. The horizontal reference line MLa and the left-right display marking MLe are the same as those illustrated in FIG. 1. The dioptric power measuring position marking MLf is the marking that indicates a position at which the dioptric power is measured by a lens meter or the like. The layout markings ML are not limited to the markings described above. For example, the layout markings ML may not include at least some of the layout markings ML described above or may include other markings.

The hidden markings MH include alignment reference markings MHh and MHi. The alignment reference markings MHh and MHi serve as the reference of the positions of the layout markings ML when the layout markings ML are formed (e.g., printed). The alignment reference markings MHh and MHi are composed of two markings that are equidistant from a perpendicular plane passing through a dioptric power measuring position Lc (or the optical center) of the lens and apart from each other by 34 mm. The alignment reference marking MHh is formed at a position (certain position) P7 apart from the dioptric power measuring position Lc of the lens by 17 mm in the right horizontal direction while the alignment reference marking MHi is formed at a position (certain position) P8 apart from the dioptric power measuring position Lc of the lens by 17 mm in the left horizontal direction. The alignment reference markings MHh and MHi are typically formed on the outer surface of the semi-finished lens by transfer from a mother mold in forming the lens. The alignment reference markings MHh and MHi may be engraved on the inner surface of the intermediate lens after the polishing processing.

Examples of the hidden markings MH other than the alignment reference markings are described below. The hidden markings MH are not limited to those described below and may include other markings. The manufacturer marking indicates information about a manufacturer or a supplier (glasses shop as a customer) of the spectacle lens. The manufacturer marking is a customer's brand name engraved in accordance with a request from the customer. The product marking indicates information about a product. Some of the product markings have display designs changed by surface treatment.

The hidden markings MH other than the alignment reference markings MHh and MHi are formed at a position (certain position) P9 on the lower side of the alignment reference marking MHi on the ear side or a position (certain position) P10 on the upper side of the alignment reference marking MHi on the ear side, for example. The hidden markings MH other than the alignment reference markings MHh and MHi may be formed at a position (not illustrated) on the lower side or on the upper side of the alignment reference marking MHh on the nose side.

The alignment reference markings MHh and MHi are typically formed by transfer from a mother mold in forming the semi-finished lens, for example. The semi-finished lens is a lens only the outer surface of which is completed as an optical surface out of the outer surface and the inner surface thereof, for example. The semi-finished lens is manufactured as the spectacle lens by grinding and polishing the inner surface thereof. The alignment reference markings MHh and MHi are formed on the outer surface (the optical surface is almost established in forming) on which no grinding and polishing are performed of the semi-finished lens, for example. In this case, hidden markings MHj and MHk, which are the hidden markings other than the alignment reference markings, are typically engraved on the inner surface of the intermediate lens after the polishing processing. The hidden markings other than the alignment reference markings are called the product information markings in the same manner as the progressive-power lens.

Figure 3:
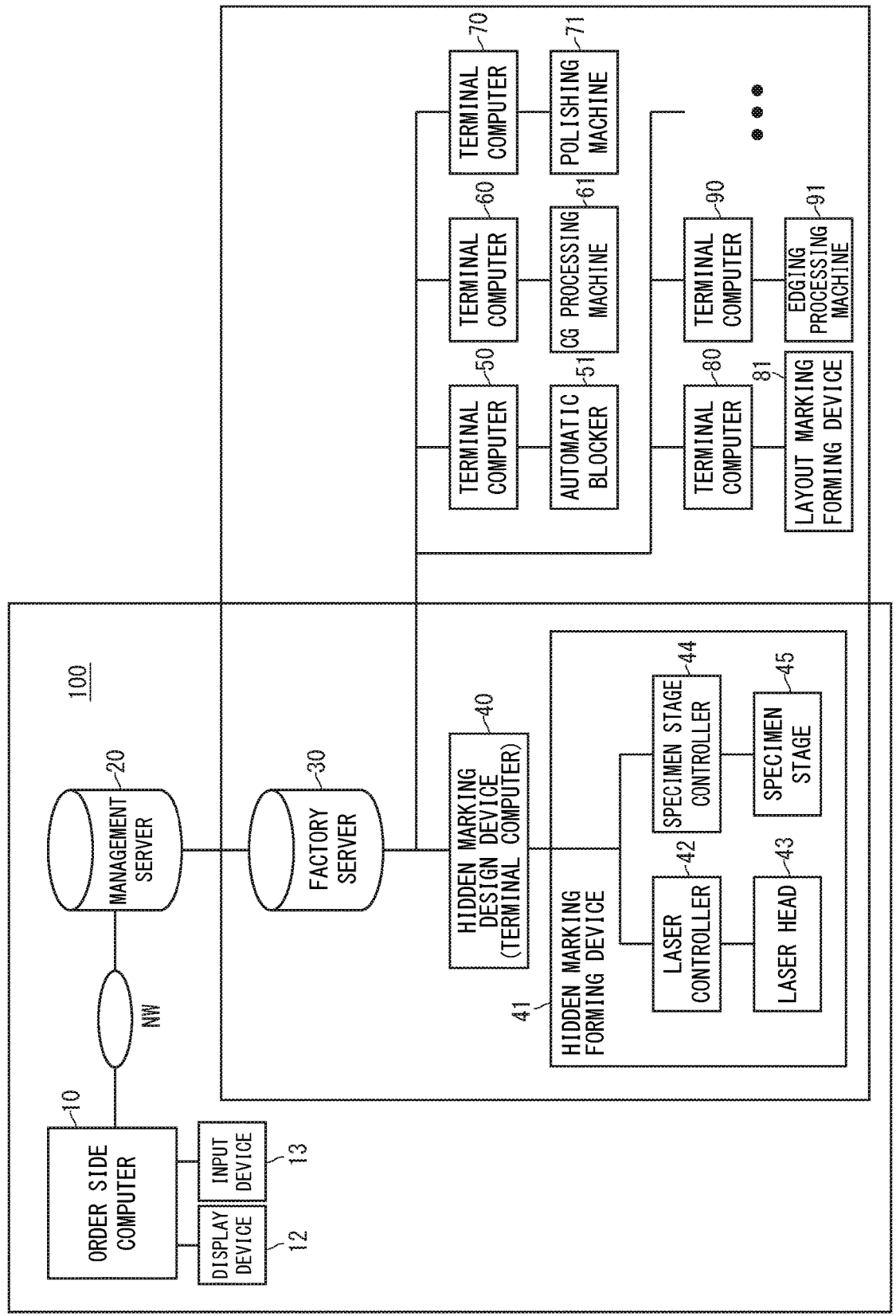
FIG. 3 is a block diagram illustrating a spectacle lens manufacturing system.
Figure 5:
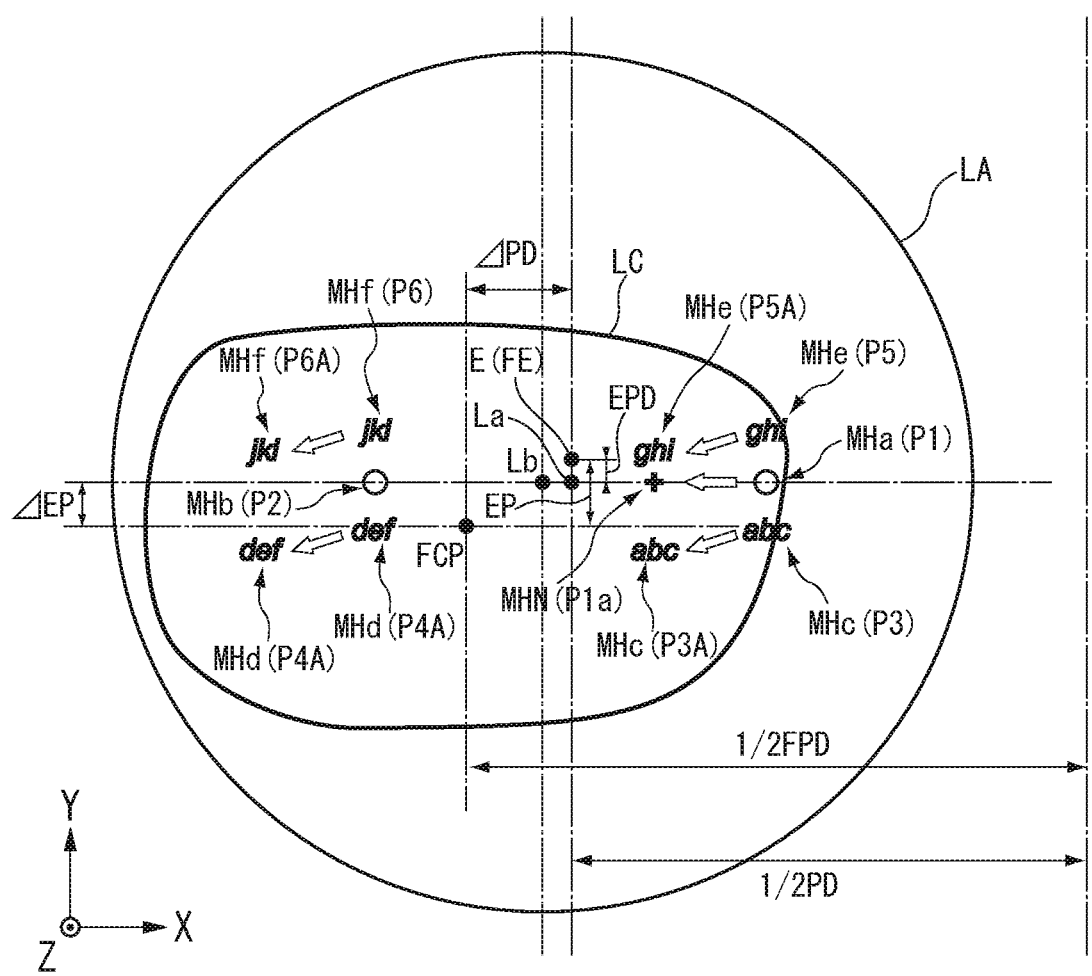
FIG. 5 is a diagram illustrating an example of setting hidden markings MH on the progressive-power lens LA succeeding from FIG. 4.

The following describes a spectacle lens manufacturing system according to the embodiment. FIG. 3 is a block diagram illustrating a spectacle lens manufacturing system 100 according to the embodiment. The spectacle lens manufacturing system 100 manufactures the spectacle lens (circular lens) LA or a spectacle lens (edged lens) LC (which is illustrated in FIG. 5 later) on which the hidden markings MH are formed. The manufacturing system described herein manufactures a progressive-power lens by grinding and polishing the inner surface of the semi-finished lens.

The spectacle lens manufacturing system 100 includes an order side computer (external input device) 10, a management server 20, a factory server 30, a hidden marking design device 40, and a hidden marking forming device 41, for example. The order side computer 10 is installed on an orderer side, for example. The factory server 30, the hidden marking design device 40, and the hidden marking forming device 41 are installed in a factory 31 (a contractor side), for example.

The order side computer 10, the management server 20, the factory server 30, and respective terminal computers and controllers (40, 42, 44, 50, 60, 70, 80, and 90) each have a computing processing unit such as a central processing unit (CPU), storage units such as a main storage unit and an auxiliary storage unit, and a communication interface that sends and receives electronic information. The communication interface may be both a wired one and a wireless one.

The order side computer 10 is achieved by a desktop or notebook personal computer, a tablet mobile terminal, or a smartphone, for example. The order side computer 10 is coupled to the management server 20 via a network NW such as the Internet. FIG. 3 illustrates an example where the order side computer 10 is connected to the single network NW. The connection manner is not limited to this example. The multiple order side computers 10 may be connected to the network NW. As the network NW, a communication line network such as an intranet or a local area network (LAN) can be used, for example.

The order side computer 10 transmits, to the management server 20 via the network NW, spectacle lens product-related information, spectacle frame-related information, wearer's prescription-related information, and wearer's fitting-related information.

The spectacle lens product-related information indicates information about a spectacle lens product. For example, the spectacle lens product-related information includes information to identify a supply origin and a commercial product name of the spectacle lens, or information to identify a refractive index of a row material of the lens. In the following description, the spectacle lens product-related information is simply called "product information".

The spectacle frame-related information indicates information about a spectacle frame. For example, the spectacle frame-related information includes information about a size (boxing size) of the spectacle frame (frame) and information about a shape of the frame. In the following description, the spectacle frame-related information is simply called "frame information".

The wearer's prescription-related information indicates information about a prescription for the wearer. For example, the wearer's prescription-related information includes a dioptric power (spherical power or S power), a cylindrical power (C power), an axis power (an angle of a cylinder axis), an add power, a prism and the like. The wearer's prescription information includes information about each of the right and the left eyes of the wearer. In the following description, the wearer's prescription-related information is simply called "prescription information".

The wearer's fitting-related information indicates information about fitting for the wearer. For example, the wearer's fitting-related information includes information about an interpupillary distance (PD) of the wearer and information about an eye position (eye point) of the wearer in the top-and-bottom direction (upper-lower direction) with respect to the frame. In the following description, the wearer's fitting-related information is simply called "fitting information".

To the order side computer 10, a display device 12 and an input device 13 are coupled. The display device 12 displays a result of calculation by the order side computer 10, a result of execution of an application stored in the order side computer 10, information input by the input device 13, information received by the order side computer 10 via the network NW, and the like. A liquid crystal display is used as the display device 12, for example. The input device 13 is used for inputting the prescription information about the wearer, the fitting information about the wearer, and the like, for example. A keyboard and a mouse are used as the input device 13, for example. A touch panel formed on the display device 12 may be used as the input device 13, for example.

The management server 20 is coupled to both the order side computer 10 via the network NW, as described above, and the factory server 30. To the management server 20, the product information, the frame information, the prescription information, and the fitting information are input from the order side computer 10 via the network, for example. The management server 20 stores therein settings such as a registered client, a commercial product, a color, and a manufacturing range, and information such as the frame information and the fitting information that have been transmitted, for example. The management server 20 determines whether it is possible to manufacture the spectacle lens.

The factory server 30 receives information transmitted from the management server 20 and produces design information about the progressive-power lens LA based on the information, for example. The factory server 30 is coupled to the respective terminal computers and the respective controllers, for example. The factory server 30 stores therein design data and design programs of the spectacle lenses, a process data generation program, and the like. The factory server 30 provides information necessary for respective processes in the spectacle lens manufacturing to the respective terminal computers and the respective controllers.

The hidden marking design device 40 (hereinafter, abbreviated as the design device 40) can perform setting of the hidden markings MH by setting the forming positions of the hidden markings MH to certain positions, calculating at least one parameter obtained from the product information, the frame information, the prescription information, and the fitting information, and changing the forming positions of the hidden markings MH based on the calculated parameter. In the following description, the parameters obtained from the product information, the frame information, the prescription information, and the fitting information are called "specific parameters" in some cases.

The design device 40 acquires, from the factory server 30, the following information necessary to set the hidden markings MH added on the inner surface of the intermediate lens that is used as the material for the progressive-power lens LA and on which the polishing processing has been performed, for example. The following information is an example. The information is not limited to the example.

The interpupillary distance (PD) between the left and the right eyes of the wearer is one of the fitting information sent from the order side. The interpupillary distance is simply called the interpupillary distance or the PD.

A distance between the left and the right centers of the spectacle frame (frame PD or FPD) is one of the frame information sent from the order side. The distance between the left and the right centers of the spectacle frame is calculated from the size (boxing size) of the spectacle frame sent from the order side, for example. For example, when the boxing size is represented as "50☐18", FPD=50+18=68. The FPD is sent directly to the factory server 30 or the like from the order side without via the management server 20 sometimes.

A distance (frame eye point height or EP) in the top-and-bottom direction (upper-lower direction) between the spectacle frame center and the eye position E (eye point) of the wearer is one of the fitting information sent from the order side. For the progressive-power lens, a distance eye point FE of the wearer is used as the eye position E of the wearer. For the single-vision lens, the eye position E is used.

A distance (eye point height or EPD) in the top-and-bottom direction (upper-lower direction) between the prism reference point and the distance eye point FE is one of the product information. The distance in the top-and-bottom direction (upper-lower direction) between the prism reference point and the distance eye point is a unique value for each commercial product, for example. When the commercial product name is identified from the product information sent from the order side, the value is identified in the information stored in the manufacturer's computer. The EPD typically has a value of 2 mm, 3 mm, or 4 mm, for example. For the progressive-power lens, the distance eye point FE of the wearer is used while for the single-vision lens, the eye position E is used.

A horizontal direction threshold is one of the specific parameters. The horizontal direction threshold is a value that is preliminarily set and stored in the factory server 30. The horizontal direction threshold is used for resetting the forming positions and forming forms of the hidden markings MH when a parameter calculated from the PD and the FPD exceeds the threshold. For example, the parameter calculated from the PD and the FPD is a difference between the spectacle frame center distance and the interpupillary distance. The difference between the spectacle frame center distance and the interpupillary distance is expressed as $\Delta PD = FPD/2 - PD/2$, for example. When the parameter calculated from the PD and the FPD is $\Delta PD = FPD/2 - PD/2$, the horizontal direction threshold can be set in a range between 0 mm and 5 mm inclusive, and in a range between 1 mm and 3 mm inclusive. The setting value of the horizontal direction threshold can be changed depending on the type of product or the size or the shape of the frame. The parameter calculated from the PD and the FPD is not limited to $\Delta PD = FPD/2 - PD/2$. For example, the parameter may be a ratio between the PD and the FPD.

A perpendicular direction threshold is one of the specific parameters. The perpendicular direction threshold is a value that is preliminarily set and stored in the factory server 30. The perpendicular direction threshold is used for resetting the forming positions and the forming forms of the hidden markings MH when a parameter calculated from the EP and the EPD exceeds the threshold. The parameter calculated from the EP and the EPD is a difference ($\Delta EP = EP - EPD$) between a distance in the upper-lower direction between the eye point and the spectacle frame center and a distance in the upper-lower direction between the eye point and the prism reference point, for example. When the parameter calculated from the EP and the EPD is $\Delta EP = EP - EPD$, the horizontal direction threshold can be set in a range between 0 mm and 5 mm inclusive, and in a range between 1 mm and 3 mm inclusive. The setting values of those thresholds can be changed depending on the type of product or the size or the shape of the frame. The parameter calculated from the EP and the EPD is not limited to $\Delta EP = EP - EPD$. For example, the parameter may be a ratio between the EP and the EPD.

A horizontal direction shift amount is one of the specific parameters. The horizontal direction shift amount is a value that is preliminarily set and stored in the factory server. The horizontal direction shift amount is the shift amount of the hidden markings MH in the horizontal direction when a parameter calculated from the PD and the FPD exceeds a certain threshold. For example, when the parameter calculated from the PD and the FPD exceeds the certain threshold, the positions of the hidden markings MHc to MHf other than the alignment reference markings MHa and MHb are horizontally shifted, on the basis of the horizontal direction shift amount, from the initially set positions (P3 to P6 illustrated in FIG. 1) in a direction toward the frame center from the prism reference point La by the certain amount. The horizontal direction shift amount can be expressed as $|\Delta PD| = |FPD/2 - PD/2|$, for example. The horizontal direction shift amount is not limited to this particular amount. The horizontal direction shift amount may be set for each hidden marking MH individually. For example, the horizontal direction shift amount of the hidden marking (MHc and/or MHe) on the nose side of the frame center can be set as $|\Delta PD| + 1$ (mm) while the horizontal direction shift amount of the hidden marking (MHd and/or MHf) on the ear side of the frame center can be set as $|\Delta PD| - 1$ (mm). The horizontal direction shift amount can be set in a range of $|\Delta PD| \pm 5$ (mm) and in a range of $|\Delta PD| \pm 3$ (mm), for example. The hidden markings (MHc and MHe) on the nose side of the frame center and the hidden markings (MHd and MHf) on the ear side of the frame center can be arranged symmetric with respect to the perpendicular line passing through the frame center.

A direction of the horizontal direction shift is one of the specific parameters. The direction of the horizontal direction shift is determined by comparing $\Delta PD$ with the certain threshold described above, for example. For example, when the certain threshold is zero, the shift amount in the horizontal direction is determined by the following manner. When $\Delta PD > 0$, the shift is from the nose side to the ear side (left direction in FIGS. 4 to 6). When $\Delta PD < 0$, the shift is from the ear side to the nose side (right direction in FIGS. 4 to 6).

A perpendicular direction shift amount is one of the specific parameters. The perpendicular direction shift amount is a value that is preliminarily set and stored in the factory server. The perpendicular direction shift amount is the shift amount of the shift of the hidden markings MH in the perpendicular direction when a parameter calculated from the EP and the EPD exceeds a certain threshold. For example, when the parameter calculated from the EP and the EPD exceeds the certain threshold, the positions of the hidden markings MHc to MHf other than the alignment reference markings MHa and MHb are shifted in the perpendicular direction, on the basis of the perpendicular direction shift amount, from the initially set positions (P3 to P6 illustrated in FIG. 1) by the certain amount. The direction of the shift in the perpendicular direction is the direction toward the frame center from the prism reference point. The direction is toward the lower side in FIG. 4. The perpendicular direction shift amount can be expressed as |ΔEP=|EP−EPD|, for example. The perpendicular direction shift amount is not limited to this particular amount. The perpendicular direction shift amount can be set for each hidden marking individually. The hidden markings MHe and MHf can be rearranged at the same positions in the perpendicular direction. The hidden markings MHc and MHd can also be rearranged at the same positions in the perpendicular direction.

A direction of the perpendicular direction shift is one of the specific parameters. The direction of the perpendicular direction shift is determined by comparing ΔEP with the certain threshold described above, for example. For example, when the certain threshold is zero, the shift amount in the perpendicular direction is determined by the following manner. When ΔEP>0, the shift is in the lower direction. When ΔEP<0, the shift is in the upper direction.

Presence or absence of the alignment reference markings of the semi-finished lens is one of the product information. Whether the alignment reference markings MHa and MHb are already formed on the outer surface of the semi-finished lens is determined typically depending on the product. This information is stored in the factory server 30, for example.

An alignment reference auxiliary marking forming condition is one of the specific parameters. The alignment reference auxiliary marking forming condition is the condition to form an alignment reference auxiliary marking (alternate alignment reference marking) in relation to any of the alignment reference markings that may be missing (disappear) after the edging processing. The alignment reference auxiliary marking forming condition is set in the factory server 30, for example. For example, when the parameter calculated from the PD and the FPD exceeds this threshold, either one of the alignment reference marking positions is reset by the alignment reference auxiliary marking forming. For example, the parameter is a difference expressed as FPD−PD. When FPD−PD>0, at least one of the forming position and the forming form of the alignment reference marking MHa on the nose side is reset. When FPD−PD<0, at least one of the forming position and the forming form of the alignment reference marking MHb on the ear side is reset. For example, when the forming position of at least one of the alignment reference markings MHa and MHb is reset, the resetting may be performed separately from those for the other hidden markings, such as the reset position is shifted in the horizontal direction by |ΔPD|. In such resetting, the alignment reference markings MHa and MHb and the product information markings MHc to MHf are overlapped in some cases. In this case, the shift amount (forming position) of the alignment reference auxiliary marking may be changed. The change in forming form of the alignment reference auxiliary marking includes a change in marking design, for example. When the marking design is changed, the marking design is not limited to any specific design as long as the marking design is changed to one different from those of the alignment reference markings MHa and MHb. A design such as "+", which extends in two directions, can be employed. Information about the change in marking design is preliminarily registered in the factory server 30, for example. In the following description, the alignment reference auxiliary marking is simply called "auxiliary marking". The design device 40 may not include a structure that sets the auxiliary marking.

When designing the hidden markings MH, the design device 40 sets the initial forming positions of the hidden markings MH to the certain positions P1 to P6, for example. The design device 40, then, calculates a distance (ΔPD) in the horizontal direction and a distance (ΔEP) in the perpendicular direction between the prism reference point La and the frame center FC. ΔPD is represented by the expression (ΔPD=FPD/2−PD/2). ΔEP is represented by the expression (ΔEP=EP−EPD).

The design device 40, then, compares |ΔPD| and |ΔEP| with the preliminarily set respective corresponding thresholds to calculate forming positions of the hidden markings other than the alignment reference markings and the forming positions of the auxiliary markings of the alignment reference markings MHa and MHb.

The structure of the design device 40 is not limited to any specific structure. Any structure that can set the hidden markings MH as described above can be employed. For example, the design device 40 may be included in the factory server 30. FIG. 3 illustrates the single design device 40. The multiple design devices 40 may be used.

The hidden marking forming device 41 (hereinafter, abbreviated as the forming device 41) forms the hidden markings MH based on the setting set by the design device 40. The forming device 41 forms the hidden markings MH (MHa to MHf and the like) at the forming positions on the surface of the in the forming forms that are set by the design device 40, for example. For the forming device 41, a laser processing machine is used that can form the hidden markings MH by irradiating the inner surface of the spectacle lens (intermediate lens) with laser light, for example. The forming device 41 includes a laser controller 42, a laser head 43, a specimen stage controller 44, and a specimen stage 45. The laser head controller 42 performs various types of control on the laser head 43. The laser head 43 is provided in a movable manner and emits laser light, for example. The laser head 43 typically employs a carbon dioxide laser or an excimer laser, for example. The laser controller 42 controls the laser head 43 such that laser light is converged near the surface of a lens to be processed as the focal point of laser light at the set forming position so as to form the hidden markings MHa to MHf, for example. The specimen stage controller 44 controls the specimen stage 45, for example. The specimen stage 45 holds the spectacle lens (intermediate lens), for example. The specimen stage 45 can move the spectacle lens held thereby in any direction (e.g., in any of the upper, the lower, the left, and right directions). The specimen stage 45 moves the spectacle lens held thereby in laser processing performed by the laser head 43 on the spectacle lens so as to allow the laser head 43 to process the spectacle lens. The forming device 41 may employ any structure that can form the hidden markings MH based on the setting set by the design device 40.

Figure 4:
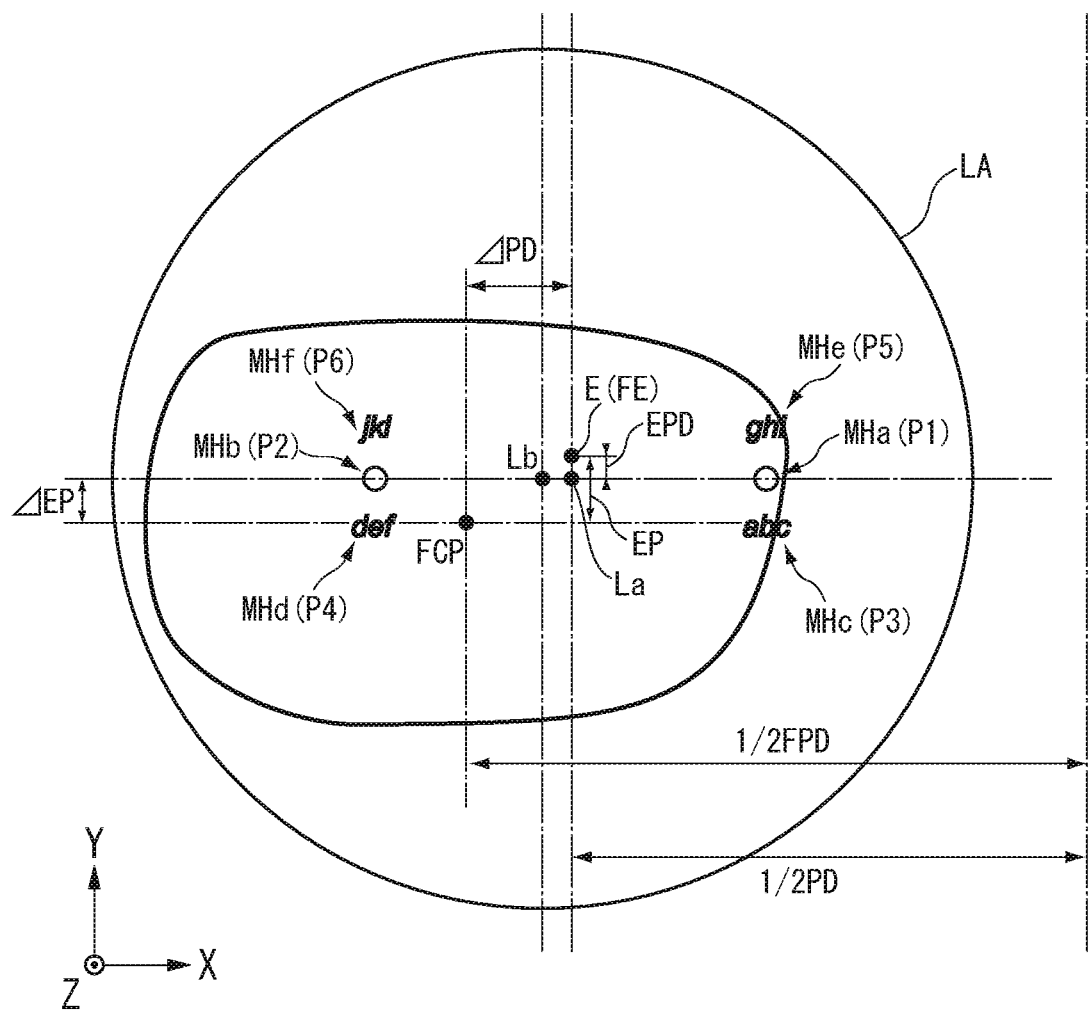
FIG. 4 is a diagram illustrating an example of setting hidden markings MH on a progressive-power lens LA.
Figure 6:
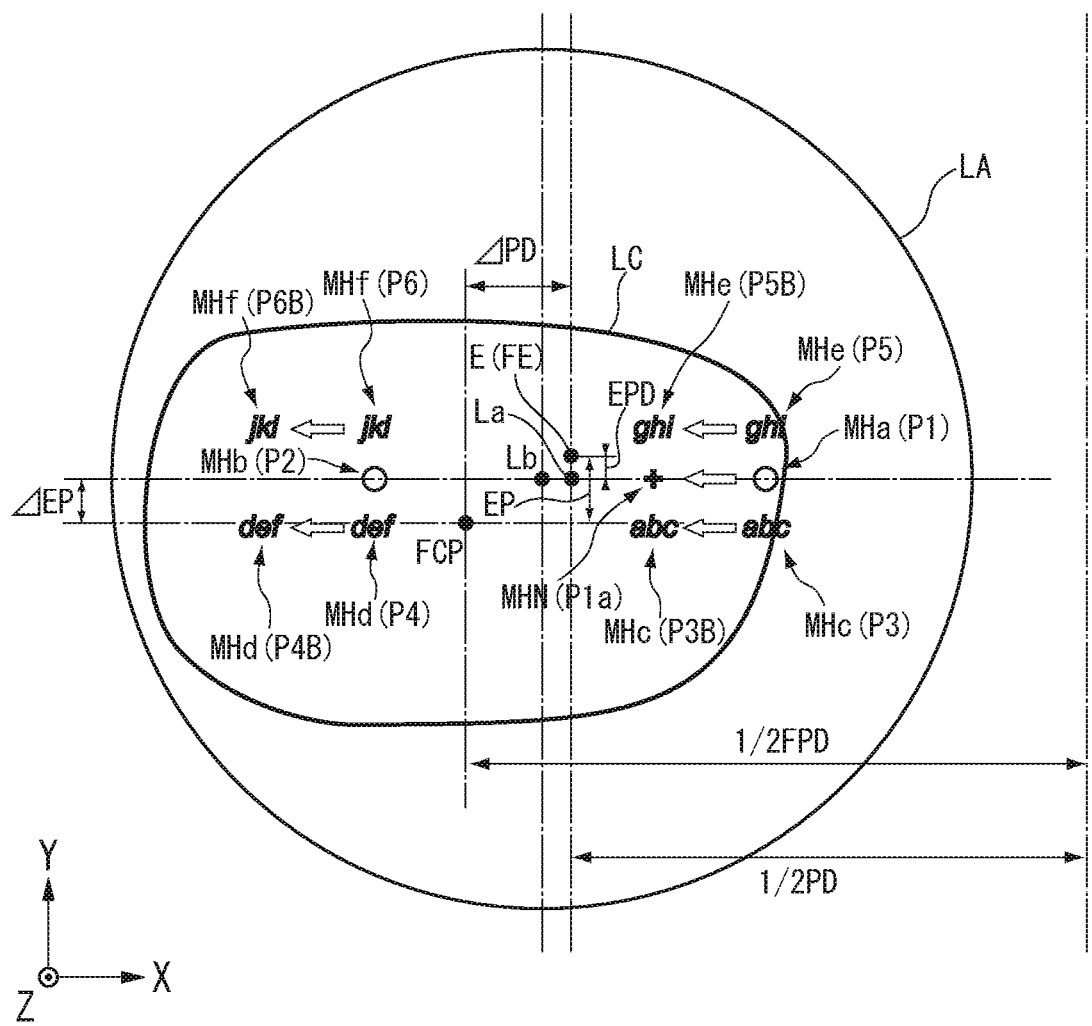
FIG. 6 is a diagram illustrating the example of setting hidden markings MH on the progressive-power lens LA succeeding from FIG. 5.

The following describes an example where the hidden markings MH are set on the progressive-power lens LA. FIGS. 4 to 6 are diagrams illustrating examples of setting the hidden markings MH on the progressive-power lens LA, and each illustrate a positional relation with a frame region. FIGS. 4 to 6 have the following common conditions of: the distance (EPD), which is the product information, between the eye point and the prism reference point is 2 mm, the frame PD, which is the frame information, is 68 mm, the interpupillary distance (PD), which is the fitting information, is 54 mm, and the distance (frame EP) in the perpendicular direction between the spectacle frame center and the eye center when the spectacle frame is worn is 4 mm. In the following description, the progressive-power lens LA for right eye is described as an example. The same description can be done on the progressive-power lens LA for left eye by reading right direction and the left direction reversed.

FIG. 4, which is a comparative example, illustrates a relation between the forming positions of the hidden markings MHa to MHf at the certain positions P1 to P6 initially set by the factory server 30 and the frame region. The hidden markings MHa to MHf are formed at the initially set certain positions P1 to P6. Normally, according to such initial setting, a spectacle lens is manufactured via processes such as the surface treatment of the spectacle lens, and the edging processing is performed on the spectacle lens by the factory, a glasses shop, or the like. On the progressive-power lens LA illustrated in FIG. 4, the hidden markings MHd and MHf on the ear side on the spectacle lens after the edging processing are formed relatively near the center of a frame. If the processing is performed based on the initial setting, the hidden markings MHc and MHe on the nose side are partially lost.

FIG. 5, which is a practical example, illustrates the spectacle lens (circular lens) LA before the edging processing and the spectacle lens (edged lens) LC after the edging processing. All of the product information, the frame information, and the frame information illustrated in FIG. 5 are the same as those illustrated in FIG. 4. FIG. 5 illustrates a relation between the forming positions of the hidden markings and the frame region after the hidden markings are rearranged by applying the embodiment. In the spectacle lens (circular lens) LA and the spectacle lens (edged lens) LC that are illustrated in FIG. 5, the parameter calculated from at least the interpupillary distance of the wearer and the spectacle frame center distance exceeds the certain value, and the respective hidden markings MHP other than the alignment reference markings MHa and MHb are arranged at an identical distance or a substantially identical distance from a spectacle frame center FCP. In the example illustrated in FIG. 5, the threshold of |ΔPD|, the threshold of |ΔEP|, the shift amount in the horizontal direction, and the shift amount in the perpendicular direction are preliminarily set to 3 mm, 1 mm, |ΔPD| mm, and |ΔEP| mm, respectively. In this case, ΔPD=68×½−54×½=7 mm and ΔEP=4−2=2 mm. The product information markings MHP (MHc to MHf) are, thus, reset to be shifted near the ear side in the horizontal direction by 7 mm and on the lower side in the perpendicular direction by 2 mm. As a result, the forming positions of the respective product information markings MHP are changed to positions P3A to P6A, respectively. The initially set position of the alignment reference marking MHb is not changed. However, ΔPD>0 and |ΔPD| exceeds the threshold. The alignment reference marking MHa on the nose side is, thus, set at the position shifted in the horizontal direction by |ΔPD| mm with a design "+" serving as the auxiliary marking MHN. In the spectacle lens (circular lens) LA and the spectacle lens (edged lens) LC, the rearranged product information markings MHP (MHc to MHe) are arranged around the frame center FCP with balance and the marking on the nose side is prevented from being partially lost, except for the alignment reference marking MHb at the initially set position.

FIG. 6, which is another practical example, illustrates the spectacle lens (circular lens) LA and the spectacle lens (edged lens) LC according to the embodiment. In the example illustrated in FIG. 6, all of the product information, the frame information, and the fitting information are the same as those illustrated in FIGS. 4 and 5. Both of the thresholds of ΔPD and ΔEP are set to 3 mm. In the example illustrated in FIG. 6, the shift amount in the horizontal direction is preliminarily set to |ΔPD| mm while the shift amount in the perpendicular direction is set to |ΔEP| mm in the same manner as FIG. 5. In this example, the rearranged hidden markings are arranged with balance around the point that is near the frame center FCP and on the upper side of the frame center FCP by 2 mm. In the spectacle lens (circular lens) LA and the spectacle lens (edged lens) LC that are illustrated in FIG. 6, the parameter calculated from at least the interpupillary distance of the wearer and the spectacle frame center distance exceeds the certain value, and the respective hidden markings MHP other than the alignment reference markings MHa and MHb are arranged around the point near the spectacle frame center FCP at an identical or substantially identical distance from the point. The point near the frame center FCP means the point that is within a distance of 5 mm from the frame center FCP.

Figure 7:
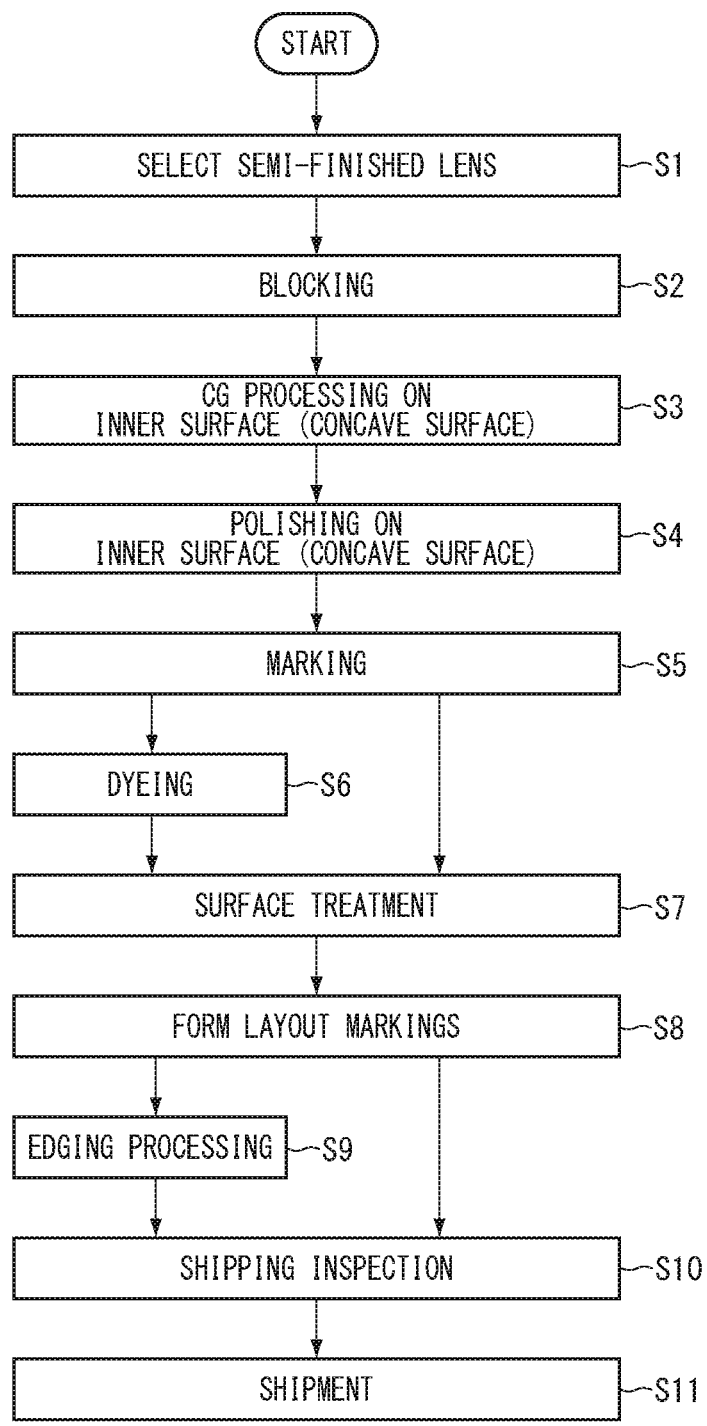
FIG. 7 is a flowchart illustrating an example of a manufacturing method of a spectacle lens according to an embodiment.
Figure 8:
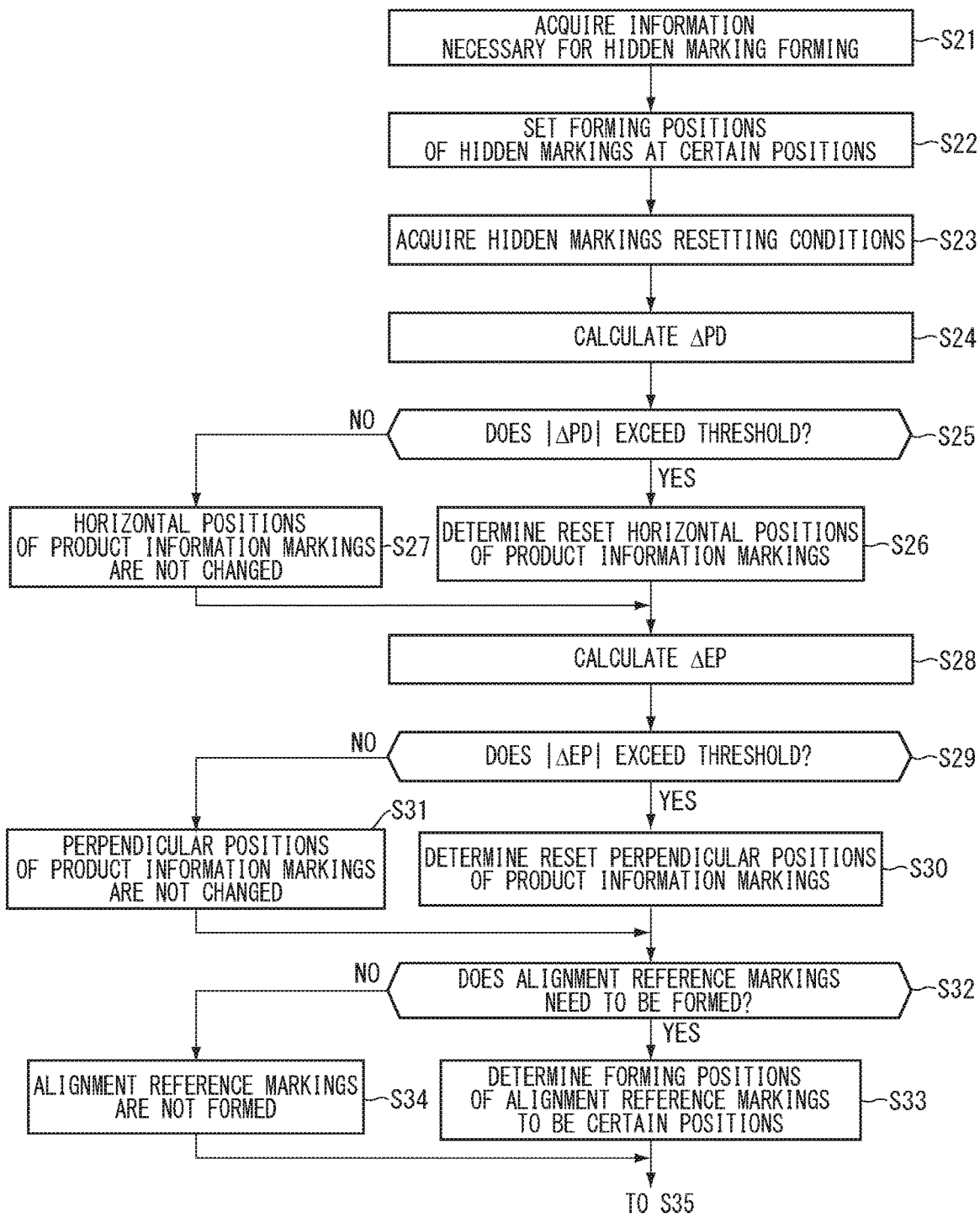
FIG. 8 is a flowchart illustrating the example of the manufacturing method of the spectacle lens succeeding from FIG. 7.
Figure 9:
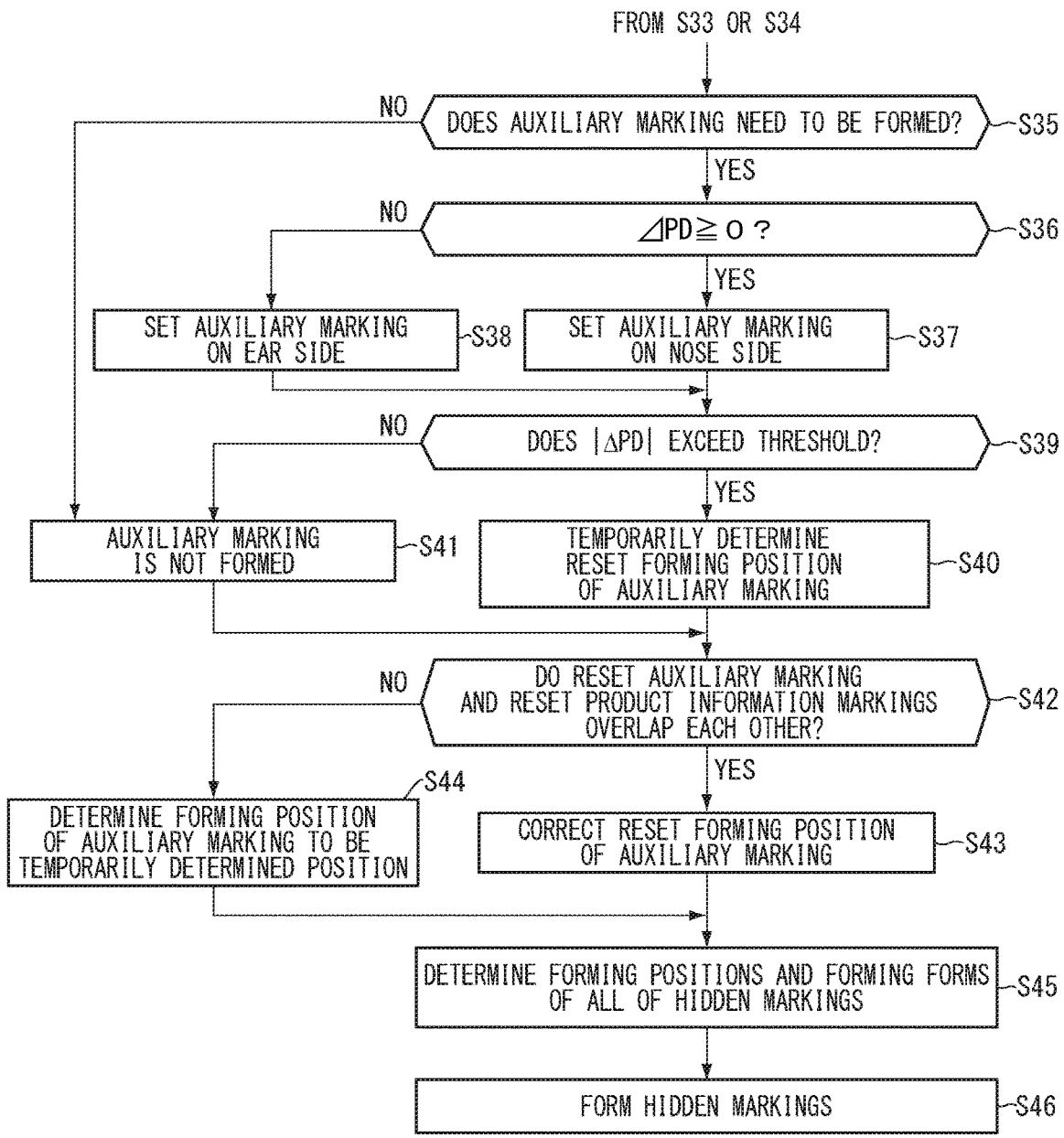
FIG. 9 is a flowchart illustrating the example of the manufacturing method of the spectacle lens succeeding from FIG. 8.
Figure 10A:
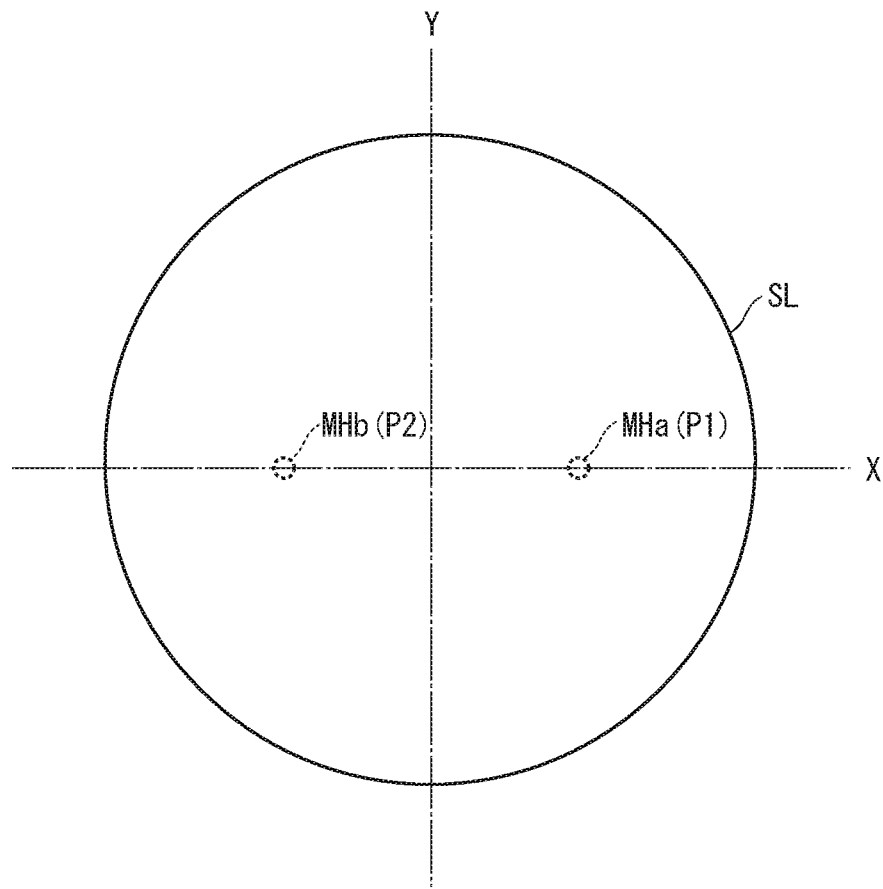
FIGS. 10A and 10B are diagram explaining blocking.
Figure 10B:
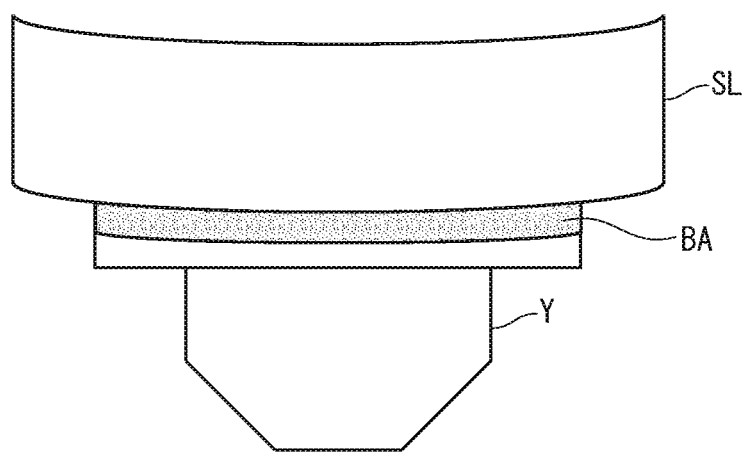
Figure 11:
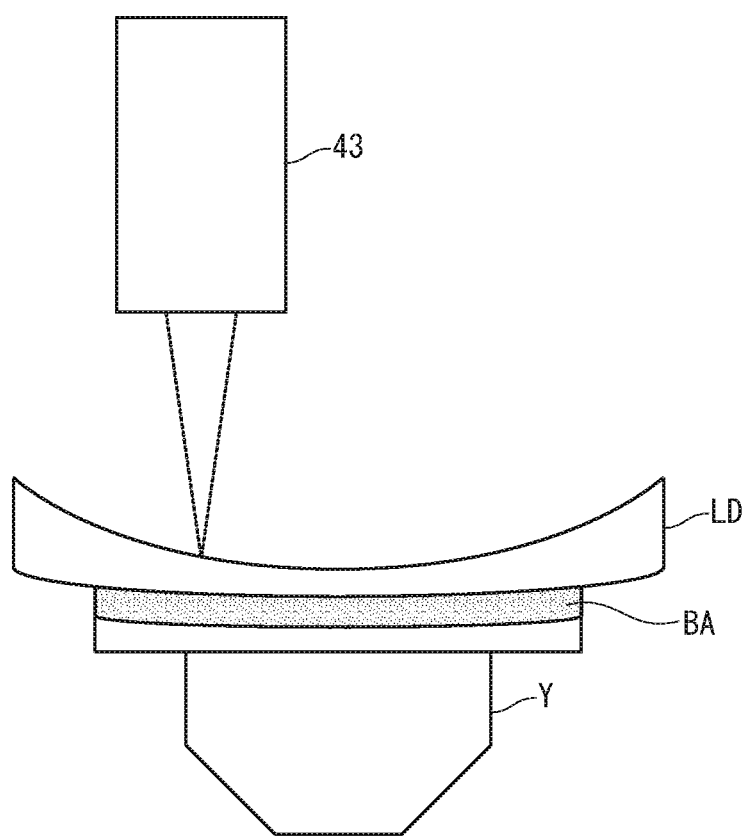
FIG. 11 is a diagram explaining laser processing.

The following describes a manufacturing method of the spectacle lens according to the embodiment on the basis of operation of the spectacle lens manufacturing system 100. FIG. 7 is a flowchart illustrating an example of the manufacturing method of the spectacle lens according to the embodiment. FIGS. 8 and 9 are flowcharts illustrating an example of the processing at step S5 in FIG. 7. FIG. 11 is a diagram explaining the laser processing. The manufacturing method of the spectacle lens is described with reference to FIGS. 3, 9, and 10 as appropriate. The manufacturing method of the spectacle lens described below is an example, and is not limited to the example described below.

First, an orderer operates the input device 13 of the order side computer 10 illustrated in FIG. 3 to input necessary various types of information such as the product information, the frame information, the prescription information, and the fitting information to the order side computer 10, for example. The orderer, then, instructs the order side computer 10 to transmit the various types of information to the management server 20. In accordance with the instruction, the order side computer 10 transmits the various types of information to the management server 20 from the communication interface via the network NW.

After the order side computer 10 transmits the various types of information, the management server 20 receives the information via the network NW. The management server 20 determines whether manufacturing is possible on the basis of the setting such as the registered client, the commercial product, the color, and the manufacturing range, and the product information and the fitting information that have been transmitted. When it is determined that manufacturing is possible, the management server 20 replies a delivery date, and an order number to the order side, stores therein order information, and transmits the order information to the factory server 30.

At step S1 illustrated in FIG. 7, the factory server stores therein the obtained received information and selects a semi-finished lens to be used based on the product information and the prescription information. The factory server 30 calculates surface shape data of the inner surface formed by polishing in curve generation processing (hereinafter abbreviated as the CG processing), and sends data necessary for respective processes to dedicated terminal computers of the respective processes.

At step S2, blocking is performed on the semi-finished lens selected at step S1 necessary for the CG processing on the inner surface. FIGS. 10A and 10B are diagrams illustrating blocking. FIG. 10A is a top view while FIG. 10B is a side view. As illustrated in FIG. 10B, blocking is a process in which a lens holder called a yatoi Y is bonded to a semi-finished lens SL. In the blocking, a protective film is preliminarily closely stuck to the outer surface (convex surface) finished as an optical surface of the semi-finished lens SL, and the yatoi Y and the semi-finished lens SL are bonded by a dedicated device (not illustrated) from above the protective film with a bond BA. For the bond BA, a low melting point alloy called an alloy is typically used.

The semi-finished lens SL bonded to the yatoi Y as described above is attached to a CG processing machine 61 at step S3 in FIG. 7, by which the inner surface (concave surface) of the semi-finished lens SL is processed into the calculated surface shape by cutting processing. At step S4, the inner surface (concave surface) is polished by a polishing machine 71 to be finished in a desired surface shape. The intermediate lens after the polishing processing at step S4 is subjected to marking.

In marking at step S5, the hidden markings are formed on the intermediate lens. The following describes the processing at step S5 with reference to FIGS. 8 and 9. At step S21 illustrated in FIG. 8, the design device 40 acquires information necessary for the hidden marking forming processing. For example, design device 40 acquires information about whether the alignment reference markings need to be formed, the threshold of $\Delta PD$, the shift amounts in the horizontal direction of the hidden markings, the threshold of $\Delta EP$, and the shift amounts in the perpendicular direction of the hidden markings.

As for whether the alignment reference markings need to be formed, the design device 40 determines "unnecessary" for the product in which the markings are already formed on the outer surface (convex surface) of the semi-finished lens by transferring from the mother mold while determines "necessary" for the other case. The design device 40 selects, for each product, for each size of the frame, or the like, the preliminarily registered conditions of the threshold of $\Delta PD$, shift amounts in the horizontal direction of the hidden markings, the threshold of $\Delta EP$, and the shift amounts in the perpendicular direction of the hidden markings.

At step S22, the design device 40 preliminarily sets the forming positions of the hidden markings MHa to MHf to the certain positions on the intermediate lens after the completion of the polishing processing at step S4. For example, the design device 40 sets the forming positions of the alignment reference markings MHa and MHb to the certain positions P1 and P2 illustrated in FIG. 4. The design device 40 sets the forming positions of the product information markings MHP to the positions P3 to P6 illustrated in FIG. 4.

At step S23, the design device 40 acquires hidden markings resetting conditions. For example, receiving the notification from the factory server 30, the design device 40 reads information about the interpupillary distance (PD), the frame center distance (FPD), the distance (EP) in the top-and-bottom direction (upper-lower direction) between the frame center and the wearer's eye position (eye point), and the eye point height (EPD) that are stored in the factory server 30. This operation causes the various types of information stored in the factory server 30 to be transmitted to the design device 40. The information is stored in a storage device (not illustrated) of the design device 40.

At step S24, the design device 40 calculates the parameter calculated from the interpupillary distance and the spectacle frame center distance. For example, the design device 40 calculates the distance ($\Delta PD$) in the horizontal direction between the prism reference point La and the frame center FC. For example, $\Delta PD$ is calculated by the equation ($\Delta PD=FPD/2-PD/2$).

At step S25, the design device 40 determines whether $|\Delta PD|$ exceeds the preliminarily determined horizontal direction threshold. The horizontal direction threshold can be set in a range from 0 to 5 mm, and can also be set in a range from 1 to 3 mm. The setting value of the horizontal direction threshold is changed depending on the type of product or the size or shape of the frame in some cases.

If it is determined that $|\Delta PD|$ exceeds the preliminarily set threshold (Yes at step S25), at step S26, the design device 40 determines the reset horizontal positions of the hidden markings in the horizontal direction (X direction). For example, the design device 40 determines the reset horizontal positions of the product information markings MHP to the positions that are shifted from the initially set positions (P3 to P7) in the horizontal direction (X direction) by a preliminarily set shift amount. The shift amount in the horizontal direction can be set in a range of $|\Delta PD|\pm 5$ (mm), and can also be set in a range of $|\Delta PD|\pm 3$ (mm).

If it is determined that $|\Delta PD|$ is in the preliminarily set threshold (No at step S25), at step S27, the design device 40 performs setting such that the positions of the hidden markings in the horizontal direction (X direction) are not shifted.

At step S28, the design device 40 calculates the distance ($\Delta EP$) in the perpendicular direction between the prism reference point La and the frame center FC. For example, $\Delta EP$ is calculated as $\Delta EP=EP-EPD$ At step S29, the design device 40 determines whether $|\Delta EP|$ exceeds the preliminarily determined perpendicular direction threshold. The perpendicular direction threshold can be set in range from 0 to 5 mm, and also be set in a range from 1 to 3 mm. The setting value of the perpendicular direction threshold is changed depending on the type of product or the size or shape of the frame in some cases.

If it is determined that $|\Delta EP|$ exceeds the preliminarily set threshold (Yes at step S29), at step S30, the design device 40 determines the reset positions of the hidden markings MH in the perpendicular direction. For example, the design device 40 determines that the forming positions of the product information markings MHP are shifted from the initially set positions (P3 to P6) in the perpendicular direction (Y direction) by a preliminarily set shift amount. The shift amount is set to $|\Delta EP|$, for example.

If it is determined that $|\Delta EP|$ is in the preliminarily set threshold (No at step S29), at step S31, the design device 40 determines that the positions of the hidden markings in the perpendicular direction (Y direction) are not shifted.

At step S32, the design device 40 determines whether the alignment reference markings need to be formed. For example, when the alignment reference markings are engraved on the outer surface (convex surface), the design device 40 determines that the forming of the alignment reference markings is unnecessary. In contrast, when no alignment reference markings are formed, the design device 40 determines that the forming of the alignment reference markings is necessary.

If it is determined that the forming the alignment reference markings is necessary (Yes at step S32), at step S33, the design device 40 determines the forming positions of the alignment reference markings to be the initially set certain positions.

If it is determined that the forming the alignment reference markings is unnecessary (No at step S32), at step S34, the design device 40 performs setting such that the alignment reference markings are not formed.

At step S35 illustrated in FIG. 9, the design device determines whether the auxiliary marking needs to be formed. Whether the auxiliary marking needs to be formed is preliminarily determined for each product or in accordance with the size of the frame in some cases or determined in accordance with the customer's demand in some cases. Such information is input (stored) in the factory server 30, for example. The design device 40 determines whether the auxiliary marking needs to be formed based on the information.

If it is determined that the forming the auxiliary marking is unnecessary (No at step S35), at step S41, the design device 40 performs setting such that the auxiliary marking is not formed.

If it is determined that the forming the auxiliary marking is necessary (Yes at step S35), at step S36, the design device 40 determines whether $\Delta PD$ is equal to or larger than zero ($\Delta PD \geq 0$) or smaller than zero ($\Delta PD < 0$).

If it is determined that $\Delta PD$ is equal to or larger than zero (Yes at step S36), at step S37, the design device 40 sets the forming position of the auxiliary marking on the nose side. For example, the forming position of auxiliary marking on the nose side is determined to be the position shifted in the direction toward the frame center from the alignment reference marking on the nose side in the horizontal direction (−X direction) by a preliminarily set shift amount. For example, the shift amount can be set in a range of $|\Delta PD| \pm 5$ (mm), and can also be set in a range $|\Delta PD| \pm 3$ (mm).

If it is determined that $\Delta PD$ is smaller than zero (No at step S36), at step S38, the design device 40 sets the forming position of the auxiliary marking on the ear side. For example, the design device 40 sets the forming position of the auxiliary marking on the ear side. For example, the forming position of the auxiliary marking on the ear side is determined to be the position shifted in the direction toward the frame center from the alignment reference marking on the ear side in the horizontal direction (+X direction) by a preliminarily set shift amount. For example, the shift amount can be set in a range of $|\Delta PD| \pm 5$ (mm), and can also be set in a range $|\Delta PD| \pm 3$ (mm).

At step S39, the design device 40 determines whether $|\Delta PD|$ exceeds the preliminarily set horizontal direction threshold. The horizontal direction threshold can be set in a range from 0 to 5 mm, and can also be set in a range from 1 to 3 mm. The setting value of the horizontal direction threshold is changed depending on the type of product or the size or shape of the frame in some cases. The horizontal direction threshold at step S39 and the horizontal direction threshold at step S25 are typically set to be equal to each other, but may be set to different thresholds.

If it is determined that $|\Delta PD|$ exceeds the preliminarily set threshold (Yes at step S39), at step S40, the design device 40 temporarily determines the forming position of the auxiliary marking to be the position described above.

If it is determined that $|\Delta PD|$ does not exceed the preliminarily set threshold (No at step S39), at step S41, the design device 40 performs setting such that the auxiliary marking is not formed.

At step S42, the design device 40 determines whether the reset forming position of the auxiliary marking and the already reset forming positions of the product information markings MHP overlap with each other.

If it is determined that the reset forming position of the auxiliary marking and the already reset forming positions of the product information markings MHP overlap with each other (Yes at step S42), at step S43, the design device 40 changes again (corrects) the reset forming position of the auxiliary marking in the horizontal direction. For example, the design device 40 performs correction such that the reset forming position of the auxiliary marking in the horizontal direction is shifted in the horizontal direction by about 2 to 3 mm.

If it is determined that the reset forming position of the auxiliary marking and the already reset forming positions of the product information markings MHP do not overlap with each other (No at step S42), at step S44, the design device 40 sets the forming position of the auxiliary marking to the temporarily determined position set at step S40.

At step S45, the design device 40 determines the forming positions and the forming forms of all of the hidden markings.

At step S46, the forming device 41 forms the hidden markings MH and the auxiliary marking MHN at the forming positions in the forming forms that are determined by the design device 40. The forming device 41 forms the hidden markings MHa to MHf and the auxiliary marking MHN as illustrated in FIG. 5, for example. As a result, the spectacle lens (circular lens) LA before the edging processing according to the embodiment, which are illustrated in FIGS. 5 and 6, can be obtained.

FIG. 11 is a diagram explaining the laser processing. As illustrated in FIG. 11, the forming device 41 irradiates the intermediate lens LD after the completion of the polishing processing with laser light from the laser head 43 (refer to FIG. 3) while relatively moving the laser head 43 and the intermediate lens LD, thereby forming the hidden markings MHa to MHf and the auxiliary marking MHN on the surface of the intermediate lens LD. The relative movement between the laser head 43 (refer to FIG. 3) and the intermediate lens LD in the X and the Y directions is controlled based on the forming positions of the hidden markings and the auxiliary marking and design data of the respective markings. The movement in the Z direction is controlled by the calculated shape data of the inner surface of the intermediate lens.

Referring back to FIG. 7, at step S6, the intermediate lens is dyed if the intermediate lens is ordered to be dyed. If the intermediate lens is not ordered to be dyed, the processing skips step S6 and proceeds to step S7.

At step S7, the surface treatment is performed on the intermediate lens. At step S7, various thin films such as a hard coating film and an antireflection coating film are formed on the intermediate lens, for example.

At step S8, the layout markings are formed. For example, a layout marking forming device 81 (refer to FIG. 3) forms the layout markings ML on the surface of the spectacle lens (circular lens) LA. The layout marking forming device 81 prints the various layout markings ML at positions with reference to the alignment reference markings MHa and MHb formed on the spectacle lens (circular lens) LA.

At step S9, an edging processing machine 91 (refer to FIG. 3) performs the edging processing. At step S9, the edging processing is performed on the spectacle lens LA ordered to be subjected to the edging processing. As a result, the spectacle lens (edged lens) LC, which is illustrated in FIG. 5, corresponding to the shape of the spectacle frame is manufactured. If the spectacle lens LA is not ordered to be subjected to the edging processing, the spectacle lens LA is subjected to shipping inspection at step S10.

The layout markings of the spectacle lens (edged lens) LC, which is ordered to be subjected to the edging processing and has been edged, are removed. The resulting lens is subjected to final shipping inspection (S10) at step S10 and thereafter shipped at step S11. The spectacle lens that is not ordered to be subjected to the edging processing is subjected to the final shipping inspection after the layout markings ML are printed. The spectacle lens is shipped as the spectacle lens (circular lens) LA that has a circular shape and on which the layout markings have been printed.

As described above, the manufacturing method of the spectacle lens and the spectacle lens manufacturing system 100 according to the embodiment arrange the hidden markings on the spectacle lens inside the spectacle frame with balance and can markedly reduce the possibility of the hidden markings being partially lost or missing. In the spectacle lens and the intermediate lens in the embodiment, the hidden markings are arranged on the spectacle lens inside the spectacle frame with balance and the possibility of the hidden markings being partially lost or missing is markedly reduced.

The technical scope of the invention is not limited to the embodiment or the modification examples. For example, one or more of requirements described in the embodiment or the modification examples are omitted sometimes. The requirements described in the embodiment or the modification examples can be combined as appropriate. As far as permitted by laws, Japanese Patent Application No. 2016-161609 and the disclosures of all of the documents quoted in the present specification are incorporated by reference as a part of the description.

For example, the intermediate lens after grinding and polishing is processed into an elliptical shape or other shapes in the grinding process for the purpose of providing a thinner lens in some cases. The spectacle lens (circular lens) before the edging processing, thus, may be not limited to having a circular shape, and may have an elliptical shape or other shapes.

In the embodiment, an example is described where the design device 40 calculates a plurality of parameters obtained from the product information, the frame information, the prescription information, and the fitting information, and sets the hidden markings MH by performing at least one of the change in forming positions of the hidden markings MH and the change in forming forms of the hidden markings. The parameter may be a single parameter, for example. For example, the parameter may be a single parameter (e.g., ΔPD=FPD/2−PD/2 or a ratio between the PD and the FPD) calculated from the interpupillary distance PD of the wearer and the spectacle frame center distance FPD. For another example, the parameter may be a single parameter (e.g., ΔEP=EP−EPD or a ratio between the EP and the EPD) calculated from the eye point E of the wearer, the spectacle frame center, and the prism reference point La.

An example is described where the design device 40 calculates the parameter obtained from the product information, the frame information, the prescription information, and the fitting information. The design device 40 may calculate at least the one parameter from the product information, the frame information, and fitting information, for example. For example, the design device 40 may calculate a single parameter calculated from the eye point E of the wearer, the spectacle frame center, and the prism reference point La based on the prism reference point La serving as the product information, the eye position (aye point) E of the wearer serving as the fitting information, and the information about the spectacle frame center serving as the frame information.

For example, the design device 40 may calculate at last the one parameter obtained from the frame information and the fitting information. For example, the design device 40 may calculate a single parameter (e.g., ΔPD=FPD/2−PD/2 or a ratio between the PD and the FPD) calculated from the interpupillary distance PD serving as the fitting information and the spectacle frame center distance FPD serving as the spectacle frame information.

DESCRIPTION OF REFERENCE SIGNS 40 hidden marking design device (design device)
41 hidden marking forming device (forming device)
100 spectacle lens manufacturing system
MH, MHa, MHb, MHc, MHd, MHe, MHf, MHg, MHh, MHi, MHP, MHN hidden marking
MHa, MHb, MHh, MHi alignment reference marking

What is claimed is:

1. A manufacturing method of a spectacle lens provided with a hidden marking, the manufacturing method comprising:
setting a forming position of the hidden marking to a certain position;
changing the forming position of the hidden marking based on at least one parameter selected from a parameter calculated from an interpupillary distance of the wearer and a spectacle frame center distance and a parameter calculated from an eye point of the wearer, a spectacle frame center, and a prism reference point; and
forming the hidden marking at the forming position that has been changed.

2. The manufacturing method of a spectacle lens according to claim 1, wherein the hidden marking includes at least one of an alignment reference marking set to a certain position with reference to a prism reference point of the spectacle lens, an add power marking indicating information about an add power of the spectacle lens, a refractive index marking indicating information about a refractive index of the spectacle lens, a corridor length marking indicating information about a corridor length of the spectacle lens, a surface treatment marking indicating information about surface treatment of the spectacle lens, a manufacturer marking indicating information about a manufacturer of the spectacle lens, and an inset amount marking indicating information about a shift amount of a near dioptric power measuring position of the spectacle lens.

3. The manufacturing method of a spectacle lens according to claim 2, wherein the changing the forming position of the hidden marking includes changing forming positions of a plurality of hidden markings other than the alignment reference marking to positions that are shifted in an identical direction by an identical distance.

4. The manufacturing method of a spectacle lens according to claim 3, wherein the changing the forming position of the hidden marking includes forming an alignment reference auxiliary marking at a position that is shifted from the forming position of the alignment reference marking toward an ear side or a nose side in a horizontal direction by a certain distance.

5. The manufacturing method of a spectacle lens according to claim 1, wherein the parameter is a difference between the spectacle frame center distance and the interpupillary distance.

6. The manufacturing method of a spectacle lens according to claim 1, wherein the parameter is a difference between a distance in an upper-lower direction between the eye point and the spectacle frame center and a distance in the upper-lower direction between the eye point and the prism reference point.

7. The manufacturing method of a spectacle lens according to claim 1, wherein the changing the forming position of the hidden marking includes changing the forming position of the hidden marking to a position that is shifted on an ear side or a nose side in a horizontal direction by a certain distance.

8. The manufacturing method of a spectacle lens according to claim 1, wherein the changing the forming position of the hidden marking includes changing the forming position of the hidden marking to a position that is shifted on an upper side or a lower side in an upper-lower direction by a certain distance.

9. The manufacturing method of a spectacle lens according to claim 8, wherein,
when forming the alignment reference auxiliary marking in a case where the alignment reference auxiliary marking is capable of being formed without changing a reset position of the alignment reference marking, the alignment reference auxiliary marking is formed in a changed forming form at the reset position, and
in a case where the alignment reference auxiliary marking is incapable of being formed without changing the reset position of the alignment reference marking, the reset position is changed again and the alignment reference auxiliary marking is formed in a changed forming form at the changed reset position.

10. The manufacturing method of a spectacle lens according to claim 1, wherein changing a forming form of the hidden marking includes changing a design of the hidden marking.

11. A spectacle lens manufacturing system for manufacturing a spectacle lens provided with a hidden marking, the spectacle lens manufacturing system comprising:
a design device that is capable of setting for forming the hidden marking by setting a forming position of the hidden marking to a certain position, calculating at least one parameter selected from a parameter calculated from an interpupillary distance of the wearer and a spectacle frame center distance and a parameter calculated from an eye point of the wearer, a spectacle frame center, and a prism reference point, and changing the forming position of the hidden marking based on the calculated parameter; and
a hidden marking forming device that forms the hidden marking at the forming position that has been changed.

12. The spectacle lens manufacturing system according to claims 11, wherein the information about a prescription for a wearer and fitting-related information that indicates information about fitting for the wearer are capable of being input to the design device via a network.

13. A spectacle lens, comprising:
an alignment reference marking at a certain position relative to a prism reference point of the spectacle lens; and
a plurality of hidden markings, other than the alignment reference marking, arranged around a point near the spectacle frame center based on a parameter calculated from at least an interpupillary distance of a wearer and a spectacle frame center distance.

14. The spectacle lens according to claim 13, wherein a parameter that is calculated from a distance in an upper-lower direction between an eye point of the wearer and the spectacle frame center and a distance in the upper-lower direction between the eye point and the prism reference point exceeds a certain value.

* * * * *